US011992841B2

(12) United States Patent
Takeuchi

(10) Patent No.: US 11,992,841 B2
(45) Date of Patent: May 28, 2024

(54) TEST APPARATUS, INJECTION METHOD, AND MICROCHANNEL DEVICE

(71) Applicant: SHIMADZU CORPORATION, Kyoto (JP)

(72) Inventor: Ippei Takeuchi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 31 days.

(21) Appl. No.: 17/466,430

(22) Filed: Sep. 3, 2021

(65) Prior Publication Data

US 2022/0072546 A1 Mar. 10, 2022

(30) Foreign Application Priority Data

Sep. 7, 2020 (JP) ................................ 2020-149834
Aug. 30, 2021 (JP) ................................ 2021-139555

(51) Int. Cl.
*B01L 3/00* (2006.01)

(52) U.S. Cl.
CPC ... *B01L 3/502746* (2013.01); *B01L 3/502707* (2013.01); *B01L 3/502715* (2013.01);
(Continued)

(58) Field of Classification Search
CPC ..... B01L 2200/0621; B01L 2200/0689; B01L 2200/142; B01L 2200/16; B01L 2300/04;
(Continued)

(56) References Cited

U.S. PATENT DOCUMENTS

2010/0260626 A1* 10/2010 Fajolle .............. B01L 3/502769 417/413.2
2016/0051985 A1* 2/2016 Knight .............. B01L 3/502746 435/286.1

(Continued)

FOREIGN PATENT DOCUMENTS

CN 103602578 2/2014
CN 107847929 3/2018

(Continued)

OTHER PUBLICATIONS

Oh et al "Design of Pressure-Driven Microfluidic Networks Using Electric Circuit Analogy" Lab on a Chip 12(3):515-45 (Year: 2011).*

(Continued)

*Primary Examiner* — Christine T Mui
*Assistant Examiner* — Jonathan Bortoli
(74) *Attorney, Agent, or Firm* — WENDEROTH, LIND & PONACK, L.L.P.

(57) ABSTRACT

A test apparatus for a test using a test solution containing a sample with the use of a microchannel device is provided. The test apparatus includes a pressure application unit that is connected to a first opening and applies an air pressure to inject the test solution into a microchannel, an opening and closing unit that switches between opening and closing of a second opening, and a controller that controls the pressure application unit and the opening and closing unit. The controller controls the opening and closing unit to close the second opening, controls the pressure application unit to inject the test solution into the microchannel, controls the opening and closing unit to open the second opening after the test solution is injected into the microchannel, and controls the pressure application unit to apply an air pressure
(Continued)

to collect in a collection portion, the test solution in a branch channel.

6 Claims, 11 Drawing Sheets

(52) U.S. Cl.
CPC ... *B01L 2200/0689* (2013.01); *B01L 2200/16* (2013.01); *B01L 2300/04* (2013.01); *B01L 2300/069* (2013.01); *B01L 2300/0883* (2013.01); *B01L 2400/0487* (2013.01)

(58) Field of Classification Search
CPC ....... B01L 2300/069; B01L 2300/0816; B01L 2300/0864; B01L 2300/0883; B01L 2400/0487; B01L 3/502707; B01L 3/502715; B01L 3/502723; B01L 3/502746
See application file for complete search history.

(56) References Cited

U.S. PATENT DOCUMENTS

| | | | | |
|---|---|---|---|---|
| 2019/0177677 | A1* | 6/2019 | Jonas | C12M 23/16 |
| 2020/0276581 | A1 | 9/2020 | Imamura et al. | |

FOREIGN PATENT DOCUMENTS

| | | | |
|---|---|---|---|
| CN | 109475866 | | 3/2019 |
| CN | 110785373 | | 2/2020 |
| JP | 2017-67620 | | 4/2017 |
| JP | 2018198543 | A * | 12/2018 |
| WO | 2016/195480 | | 12/2016 |
| WO | 2018/007819 | | 1/2018 |

OTHER PUBLICATIONS

English translation of Chinese document CN 103602578A (Year: 2014).*
English translation of Japanese Document JP2017067620 (Year: 2017).*
ScienceEquip—Benefits of Choosing an Electronic Pipette Controller Jan. 2020 (Year: 2020).*
Le at al "Design and Fabrication of a PDMS-Based Manual Micro-Valve System for Microfluidic Applications" Hindawi Advances in Polymer Technology vol. 2020, Article ID 2460212, 7 pages (Year: 2020).*
Yamada et al Generation of uniform-size droplets by multistep hydrodynamic droplet division in microfluidic circuits Article in Microfluidics and Nanofluidics • (Year: 2011).*
English translation of Japanese document JP 2009109459 (Year: 2009).*
JP2018198543A English translation (Year: 2018).*
Translated Examination Opening of the State Intelectual Property Office of People's Republic of China for CN 2011028364.7 published Jul. 27, 2023 (Year: 2023).*
U.S. Appl. No. 17/942,296, filed Sep. 12, 2022 in the name of Shimadzu Corporation.

* cited by examiner

TEST APPARATUS, INJECTION METHOD, AND MICROCHANNEL DEVICE

BACKGROUND OF THE INVENTION

Field of the Invention

The present disclosure relates to a test appartus for measurement by injection of a test solution into a microchannel, an injection method, and a microchannel device.

Description of the Background Art

In order to test sensitivity or the like of bacteria to an antimicrobial, a test method using a microchannel device as in Japanese Patent Laying-Open No. 2017-67620 has been known. For example, in Japanese Patent Laying-Open No. 2017-67620, in a microchannel device including an introduction port and a discharge port that communicate with the outside and a channel through which a test solution supplied from the introduction port flows toward the discharge port, by injecting air into the channel from the introduction port, the test solution introduced previously is pressed into small channels. The channel is provided with a reaction portion where the test solution supplied from the introduction port is stored and an agent arranged in the reaction portion acts on bacteria.

SUMMARY OF THE INVENTION

In filling a microchannel with a test solution, a method using a capillary action or a pressure application has been known. A method of injecting air as in Japanese Patent Laying-Open No. 2017-67620 is effective for reliably and quickly fill the microchannel with the test solution. When the test solution is injected from one introduction port into a microchannel device in which branching into a plurality of channels is made, however, there may be a difference in height of a fluid level (a fluid head) between channels or in a portion from the introduction port to a channel, and the difference may cause a flow of the test solution in each channel. When a flow of the test solution is produced in the reaction portion, a correct result may not be observed.

The present disclosure was made to solve such a problem, and the present disclosure provides a test apparatus, an injection method, and a microchannel device that can suppress a flow of a test solution produced in a channel and can allow observation of a correct result.

A test apparatus in the present disclosure is a test apparatus for a test using a test solution containing a sample with a microchannel device. The microchannel device includes a first opening where the test solution is received, a plurality of branch channels that communicate with the first opening, a plurality of microchannels that communicate with each of the branch channels, a collection portion where some of the test solution is collected, the collection portion being provided at an end of each of the branch channels located opposite to a side where communication with the first opening is established, and a second opening provided in the collection portion. The test apparatus includes a pressure application unit that is connected to the first opening and applies an air pressure to inject the test solution into the microchannels, an opening and closing unit that switches between opening and closing of the second opening, and a controller that controls the pressure application unit and the opening and closing unit. The controller controls the opening and closing unit to close the second opening and controls the pressure application unit to inject the test solution into the microchannels, and the controller controls the opening and closing unit to open the second opening after the test solution is injected into the microchannels and controls the pressure application unit to apply an air pressure to collect in the collection portion, the test solution in each of the branch channels.

An injection method in the present disclosure is an injection method of injecting a test solution containing a sample into a microchannel device. The microchannel device includes a first opening where the test solution is received, a plurality of branch channels that communicate with the first opening, a plurality of microchannels that communicate with each of the branch channels, a collection portion where some of the test solution is collected, the collection portion being provided at an end of each of the branch channels located opposite to a side where communication with the first opening is established, and a second opening provided in the collection portion. The injection method includes closing the second opening, connecting a pipet that has suctioned the test solution to the first opening, injecting the test solution into the microchannels by discharging the suctioned test solution to the first opening, opening the second opening, and applying an air pressure with the pipet to collect in the collection portion, the test solution in each of the branch channels.

A microchannel device in the present disclosure is used in a test using a test solution containing a sample, and includes a first opening where the test solution is received, a plurality of branch channels that communicate with the first opening, a plurality of microchannels that communicate with each of the branch channels, a collection portion where some of the test solution is collected, the collection portion being provided at an end of each of the branch channels located opposite to a side where communication with the first opening is established, and a second opening provided in the collection portion.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
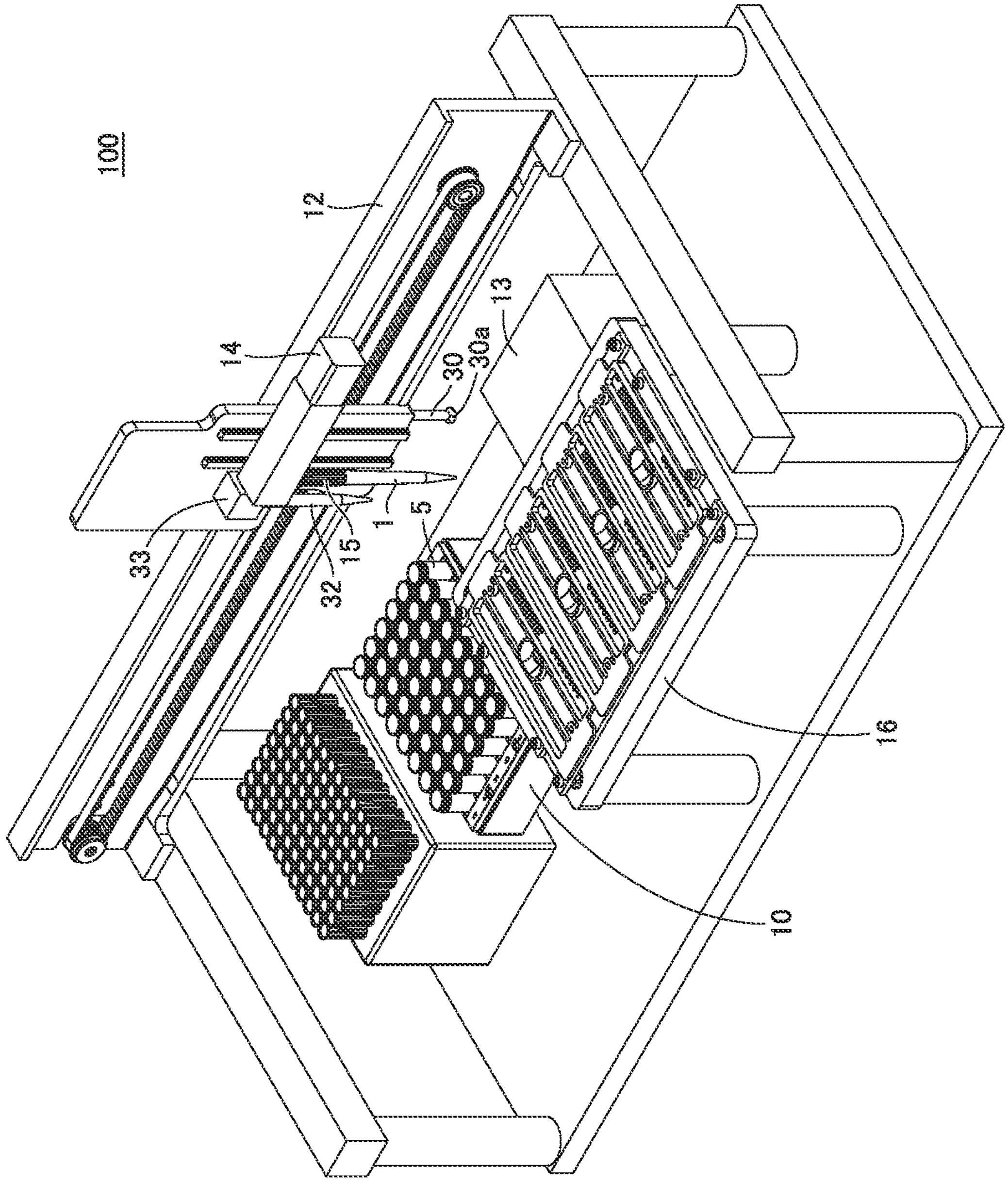
FIG. 1 is a diagram showing an exemplary overall construction of a test apparatus according to the present embodiment.

An embodiment of the present disclosure will be described below in detail with reference to the drawings. The same or corresponding elements in the drawings have the same reference characters allotted and description thereof will not be repeated.

[Apparatus Construction]

Figure 2:
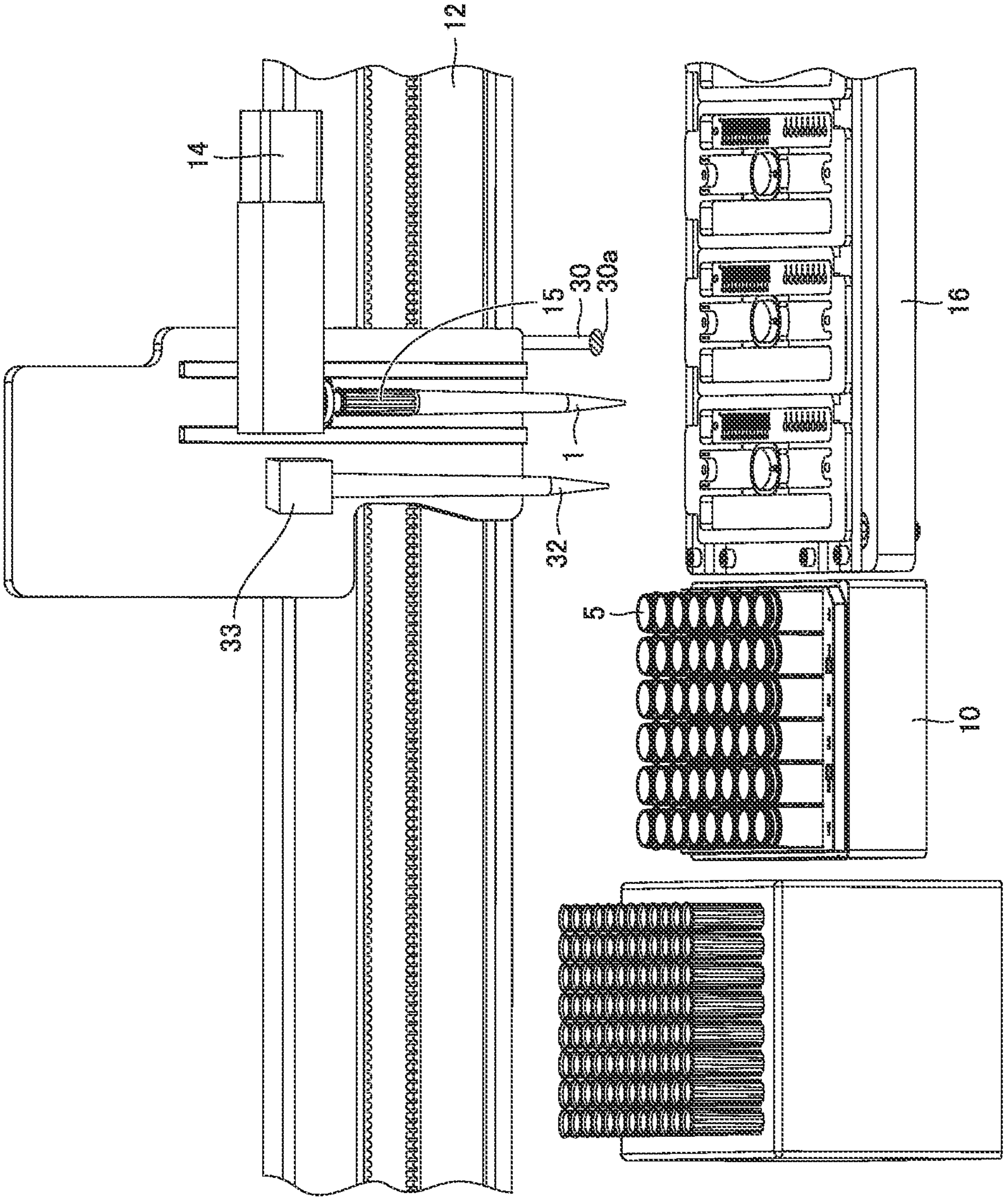
FIG. 2 is a diagram showing an exemplary construction around a pipet nozzle in the test apparatus according to the present embodiment.
Figure 3:
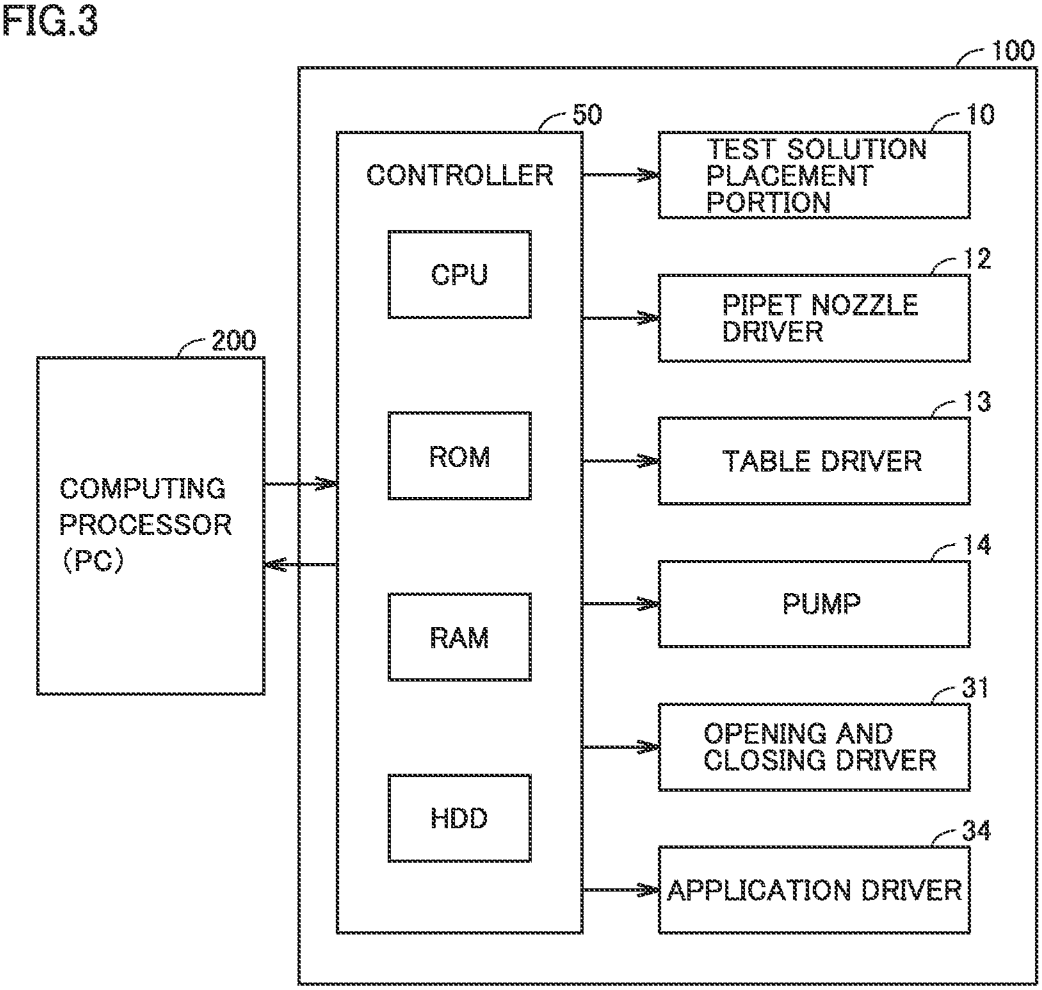
FIG. 3 is a block diagram for illustrating control of the test apparatus according to the present embodiment.

FIG. 1 is a diagram showing an exemplary overall construction of a test apparatus according to the present embodiment. FIG. 2 is a diagram showing an exemplary construction around a pipet nozzle in the test apparatus according to the present embodiment. FIG. 3 is a block diagram for illustrating control of the test apparatus according to the present embodiment. The test apparatus in the present disclosure is an apparatus for measurement of a test solution containing a sample by injecting the test solution into a microchannel in a microchannel device, and an example in which the test solution is injected into a microchannel for measuring sensitivity of bacteria to an antimicrobial (agent) is described below by way of example. The test solution contains a sample. The sample may be bacteria (pathogenic bacteria in a specific example). In the specific example, the test solution may be a suspension of bacteria. Naturally, for the test apparatus in the present disclosure, so long as a test solution is injected into a microchannel in a microchannel device, limitation to the test solution described above is not intended.

Referring to FIGS. 1 to 3, a test apparatus 100 includes a test solution placement portion 10, a pipet nozzle driver 12, a table driver 13, a pump 14, a pipet nozzle 15, a table 16, an opening and closing unit 30, an opening and closing driver 31, an applicator 32, a pump 33, an application driver 34, and a controller 50.

Test solution placement portion 10 is a rack where a plurality of test solution containers 5 each containing a test solution can be arranged. In test solution placement portion 10, a plurality of test solution containers 5 can be set on test apparatus 100, in a unit of a rack.

Pipet nozzle 15 having a removable pipet chip 1 attached thereto suctions or discharges a test solution from test solution container 5 through a tip end of pipet chip 1. Pipet nozzle driver 12 horizontally and vertically moves pipet nozzle 15 and pump 14 connected to pipet nozzle 15. Pipet nozzle driver 12 can freely move pipet nozzle 15, for example, by means of a solenoid actuator or a stepping motor.

Table 16 is a support member on which a microchannel device is carried. Table 16 is in a shape of a flat plate and a microchannel device is fixed to an upper surface thereof. Table driver 13 can horizontally move table 16. Table driver 13 can freely move table 16, for example, by means of a solenoid actuator or a stepping motor. Naturally, table driver 13 may vertically move table 16 so that pipet nozzle 15 is not vertically moved. At least pipet nozzle driver 12 and table driver 13 are each a movement mechanism for changing a position of pipet nozzle 15 and a position of a microchannel device relative to each other.

Though not shown, pump 14 includes, to example, a syringe, a plunger capable of carrying out reciprocating motion within the syringe, and a drive motor that drives the plunger. Pump 14 can regulate an air pressure in pipet chip 1 by causing the plunger to carry out reciprocating motion while the plunger is connected to pipet nozzle 15 through a pipe to suction the test solution into pipet chip 1 or discharge the test solution in pipet chip 1 to the outside. Pump 14 can deliver air to the outside of pipet chip 1 by moving the plunger further into the syringe with the test solution in pipet chip 1 having been discharged to the outside.

Opening and closing unit 30 is a mechanism that opens or closes an opening (a second opening) in the microchannel device which will be described later. Specifically, opening and closing unit 30 is a mechanism for closing the opening with an elastic member, and it is provided, for example, with a silicone resin 30*a* at a tip end of a rod-shaped support portion. Since opening and closing unit 30 is attached to pipet nozzle 15 at a predetermined position, it is moved to a position of the second opening by moving pipet nozzle 15 to an opening (a first opening) in the microchannel device. Opening and closing driver 31 drives opening and closing unit 30 that has moved to the position of the second opening to vertically move silicone resin 30*a* to press silicone resin 30*a* against the second opening to close the second opening, and thus controls the second opening to a closed state. Though FIGS. 1 and 2 show only a single opening and closing unit 30 for the purpose of simplification of illustration, a plurality of opening and closing units 30 are provided in accordance with the number of second openings to be opened and closed. Opening and closing driver 31 may not only vertically move silicone resin 30*a* but also move opening and closing unit 30 relative to pipet nozzle 15.

Applicator 32 applies a sealing material to an opening in the microchannel device in order to suppress volatilization of the injected test solution from the opening. Specifically, applicator 32 is implemented, for example, by a nozzle that discharges the sealing material such as silicone oil to the opening or the like, and applies the sealing material to the opening or the like from the nozzle by means of pump 33. The construction of applicator 32 is not limited as such, and a mechanism that applies the sealing material to the opening or the like with a brush may be applicable. Application driver 34 moves applicator 32 to a position of the opening in the microchannel device to which the sealing material is to be applied and drives pump 33. Though FIGS. 1 and 2 show the construction in which applicator 32 and pipet nozzle 15 are provided in the same movement mechanism, applicator 32 may be provided in a movement mechanism different from a movement mechanism where pipet nozzle 15 is provided and application driver 34 may move applicator 32. Unless volatilization of the test solution gives rise to a problem, test apparatus 100 does not have to include applicator 32.

Controller 50 controls an operation of test apparatus 100. Controller 50 includes a processor such as a central processing unit (CPU) and a memory such as a read only memory (ROM) and a random access memory (RAM). A control program is stored in the memory. The processor controls the operation of test apparatus 100 by execution of the control program. The memory of controller 50 may include a hard disk drive (HDD).

Controller 50 controls a motor of table driver 13 to move table 16 such that the microchannel device is located at a prescribed position. Controller 50 controls a motor of pipet nozzle driver 12 to move pipet nozzle 15 in order to discharge the test solution to the opening of the microchannel in the microchannel device after the microchannel device is moved to the prescribed position. Furthermore, controller 50 controls opening and closing driver 31 to switch between opening and closing of the opening (second opening) in the microchannel device. Controller 50 controls application driver 34 to apply the sealing material to the opening or the like in the microchannel device.

Specifically, controller 50 drives the motor of pipet nozzle driver 12 to move pipet nozzle 15 to a position of prescribed test solution container 5, and controls pump 14 to suction the test solution in test solution container 5 from the tip end of pipet chip 1. Thereafter, controller 50 controls the motor of pipet nozzle driver 12 to move pipet nozzle 15 to the position of the opening in the microchannel device, and controls pump 14 to discharge the test solution from the tip end of pipet chip 1.

Controller 50 can be connected to a computing processor 200 implemented by a personal computer (PC) or a dedicated computer. A user can manage test apparatus 100 by means of computing processor 200. For example, with computing processor 200, an amount of movement of table 16 by table driver 13, an amount of movement of pipet nozzle 15 by pipet nozzle driver 12, and an amount of the test solution suctioned or discharged from the tip end of pipet chip 1 by pump 14 can be set. Computing processor 200 may electrically be connected to another apparatus arranged adjacently to test apparatus 100 to configure a test system.

[Construction of Microchannel Device]

Figure 4:
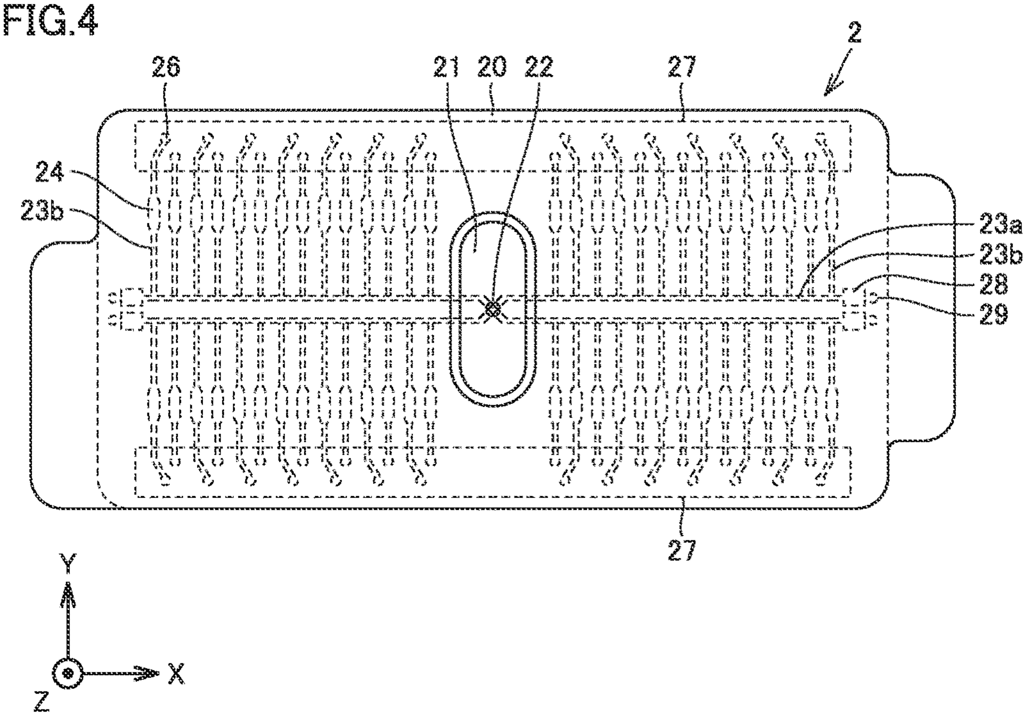
FIG. 4 is a diagram showing an exemplary construction of a microchannel device according to the present embodiment.

FIG. 4 is a diagram showing an exemplary construction of the microchannel device according to the present embodiment. FIG. 4 shows a plan view of a microchannel device 2. Microchannel device 2 is placed on table 16 of test apparatus 100.

As shown in FIG. 4, microchannel device 2 includes a plate-shaped member 20 and a channel structure. The channel structure includes an aperture 21, an opening 22 (first opening), a branch channel 23*a*, a microchannel 23*b*, a reservoir 24, an opening 26 (third opening), a gas permeable membrane 27, a collection portion 28, and an opening 29 (second opening). Microchannel device 2 does not have to include opening 26 (third opening).

Opening 22 is a portion provided in aperture 21 and allows communication between aperture 21 and branch channel 23*a*. In other words, opening 22 is connected to one end of branch channel 23*a*. The test solution is injected into branch channel 23*a* from opening 22 by using a fluid pressure. The test solution injected into branch channel 23*a* is further injected into microchannel 23*b*. In the present embodiment, an air pressure is used as a fluid pressure. Opening 22 has a cross-section, for example, in an annular shape. Opening 22 has a diameter, for example, from 5 μm to 5 mm. In the present embodiment, four branch channels 23*a* are connected to opening 22. Four branch channels 23*a* are arranged radially around opening 22.

Though four branch channels 23*a* are connected to opening 22 in the present embodiment, contents of the embodiment of the present invention are not limited as such. At least one branch channel 23*a* should only be connected to opening 22. Two or three branch channels 23*a* may be connected to opening 22. Furthermore, five or more branch channels 23*a* may be connected to opening 22.

Branch channel 23*a* that extends from opening 22 is further branched into a plurality of microchannels 23*b*. Branch channel 23*a* is connected to the plurality of microchannels 23*b* such that the test solution can flow thereto. The test solution that flows in from opening 22 flows to the plurality of branched microchannels 23*b* through branch channel 23*a*. Branch channel 23*a* and microchannel 23*b* each have a rectangular cross-section, and branch channel 23*a* and microchannel 23*b* each have a width, for example, from 1 μm to 1 mm. Branch channel 23*a* and microchannel 23*b*, however, are different from each other in depth (height). For example, branch channel 23*a* has a depth of 0.5 mm, whereas microchannel 23*b* has a smaller depth of 0.025 mm. Therefore, microchannel 23*b* is higher in channel resistance than branch channel 23*a*. With microchannel 23*b* being higher in channel resistance than branch channel 23*a*, after branch channel 23*a* is once filled with the test solution that flows in from opening 22 as will be described later. the test solution can flow into the plurality of microchannels 23*b* substantially at the same time. In the present embodiment, one branch channel 23*a* is branched into fourteen microchannels 23*b*.

Branch channel 23*a* is arranged along a direction of an X axis until it is branched into the plurality of microchannels 23*b*, and after branching, each microchannel 23*b* is arranged along a direction of a Y axis. Reservoir 24 is provided at a midpoint in each branched microchannel 23*b*. The test solution that flows in from opening 22 flows through each microchannel 23*b* to reservoir 24.

An agent is arranged in reservoir 24, and reservoir 24 is connected to opening 22 through branch channel 23*a* and microchannel 23*b*. The test solution that flows in from opening 22 is stored in reservoir 24. In reservoir 24, the test solution reacts with the agent. The agent is, for example, an antimicrobial. The agent may be a solid or a liquid. The agent is placed in advance in reservoir 24. In other words, before the test solution flows into reservoir 24, the agent is placed in reservoir 24. In the present embodiment, the agent is applied to entire reservoir 24.

Reservoir 24 is formed in a shape of a parallelepiped. Reservoir 24 has a side having a length, for example, from 10 μm to 10 mm.

In FIG. 4, fifty-six (=14×4) reservoirs 24 are formed in plate-shaped member 20. An identical volume of the test solution is stored in fifty-six reservoirs 24. A type and an amount of the agent provided in fifty-six reservoirs 24 may be identical or different.

Microchannel 23*b* between reservoir 24 and opening 26 is formed such that the test solution can flow therethrough. Microchannel 23*b* is arranged along the direction of the Y axis. Microchannel 23*b* has one end connected to reservoir 24 and has the other end connected to opening 26. The test solution that flows in from reservoir 24 flows through microchannel 23*b* to opening 26.

Opening 26 is connected to the other end of microchannel 23*b*. Opening 26 has a cross-section, for example, in an annular shape. Opening 26 has a diameter, for example, from 5 μm to 5 mm.

Opening 26 is covered with gas permeable membrane 27. Specifically, in FIG. 4, fifty-six (=14×4) openings 26 are provided in plate-shaped member 20. Among fifty-six openings 26, twenty-eight openings 26 provided at an end in a positive direction of the Y axis in plate-shaped member 20 are covered with a single gas permeable membrane 27 and twenty-eight openings 26 provided at an end in a negative direction of the Y axis in plate-shaped member 20 are covered with a single gas permeable membrane 27. Each of two gas permeable membranes 27 is arranged along the direction of the X axis.

Gas permeable membrane 27 performs a function to allow passage of gas and not to allow passage of liquid therethrough. Examples of a material for gas permeable membrane 27 include polytetrafluoroethylene (PTFE). Gas permeable membrane 27 is preferably water-repellent. Gas permeable membrane 27 has a thickness not larger than 1 mm.

Gas permeable membrane 27 is fixed to plate-shaped member 20 by adhesion by an adhesive or ultrasonic welding. Examples of the adhesive include a photocurable resin, a thermosetting resin, and a pressure-sensitive resin.

Collection portion 28 is a portion where some of the test solution is collected, the portion being connected to an end of branch channel 23*a* opposite to an end connected to opening 22. Collection portion 28 is formed in a shape of a parallelepiped. Collection portion 28 has a side having a length, for example, from 10 μm to 10 mm. Collection portion 28 may be provided with a member (water absorbing member) that absorbs moisture such as a sponge. A backflow from collection portion 28 to branch channel 23*a* can thus be prevented and volatilization of the test solution from branch channel 23*a* can be prevented.

Opening 29 is connected to an end of collection portion 28 opposite to an end connected to branch channel 23*a*. From opening 22 to opening 29, the test solution can flow through branch channel 23*a* and collection portion 28. Opening 29 is closed by silicone resin 30*a* of opening and closing unit 30. By closing opening 29, the test solution that flows in branch channel 23*a* is not discharged to collection portion 28 and opening 29, and by opening opening 29, the test solution that remains in branch channel 23*a* can be discharged to collection portion 28 and collected therein.

Figure 5:
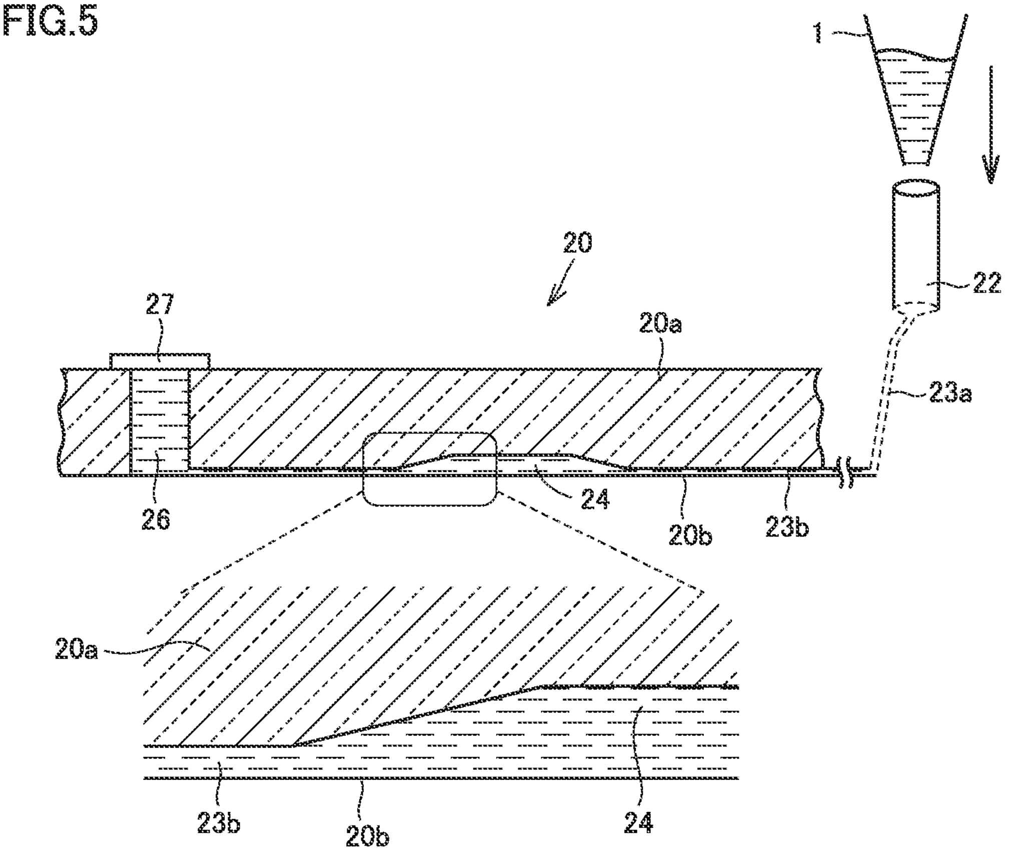
FIG. 5 is a diagram showing an exemplary construction in which a test solution is injected into a channel in the microchannel device according to the present embodiment.

FIG. 5 is a diagram showing an exemplary construction in which the test solution is injected into the channel in the microchannel device according to the present embodiment. Plate-shaped member 20 includes a first plate-shaped member 20*a* on an upper side in FIG. 5 and a second plate-shaped member 20*b* on a lower side therein. Second plate-shaped member 20*b* is layered on first plate-shaped member 20*a*. Second plate-shaped member 20*b* is arranged in a negative direction (a downward direction) of a Z axis shown in FIG. 4 with respect to first plate-shaped member 20*a*.

First plate-shaped member 20*a* and second plate-shaped member 20*b* are each formed of a transparent material into a shape of a rectangular plate. Examples of the material for first plate-shaped member 20*a* and second plate-shaped member 20*b* include an acrylic resin such as poylmethyl methacrylate and glass. A channel structure is formed in first plate-shaped member 20*a*. Specifically, in first plate-shaped member 20*a*, opening 22, branch channel 23*a*, a microchannel 23*b*, reservoir 24, opening 26, and collection portion 28 (see FIG. 4) are provided. Second plate-shaped member 20*b* functions as a lower surface for opening 22, branch channel 23*a*, microchannel 23*b*, reservoir 24, opening 26, and collection portion 28. A thickness of first plate-shaped member 20*a* and second plate-shaped member 20*b* is set, for example, to 0.5 mm to 3 mm, although it is not particularly limited. Though second plate-shaped member 20*b* is directly fixed to first plate-shaped member 20*a* by ultrasonic welding, it may be fixed by an adhesive.

In the present embodiment, the test solution suctioned by pipet chip 1 is discharged to aperture 21 in microchannel device 2, and an air pressure is applied to the discharged test solution to inject the test solution from opening 22 into microchannels 23*b*. In order to inject the test solution into microchannels 23*b* by application of a pressure, an injection pad (not shown) that covers aperture 21 that communicates with microchannels 23*b* may be provided. In an example where the injection pad is provided, however, when the injection pad is pressed against aperture 21 and an air pressure is applied to the test solution to inject the test solution into microchannels 23*b*, the test solution may adhere to the injection pad and the injection pad may be contaminated. Since the injection pad is repeatedly used for another microchannel device, the test solution that has previously been subjected to measurement may be introduced (contamination) in measurement of another test solution, which may affect a result of the test.

Then, in an example where an injection pad attachable to pipet chip 1 is prepared and a pressure is applied to the test solution to inject the test solution into microchannels 23*b*, an air pressure is delivered from pipet chip 1 while aperture 21 is covered with the injection pad. Thereafter, the injection pad may be disposed of together with pipet chip 1. Therefore, contamination with the test solution is prevented and a highly accurate test result is obtained.

As shown in FIG. 5, the test solution that flows in from pipet chip 1 flows through opening 22 and branch channel 23*a*, and microchannel 23*b*, reservoir 24, and opening 26 are filled therewith. In microchannel device 2, however, the plurality of microchannels 23*b* communicate with one another through branch channel 23*a* Therefore, when the test solution is injected from single opening 22 through branch channel 23*a* into microchannel device 2 in which branched into the plurality of microchannels 23*b* is made and when a height of a fluid level (fluid head) is different between channels, or in a portion from opening 22 to a channel, the difference causes a flow of the test solution in each channel.

Figure 6:
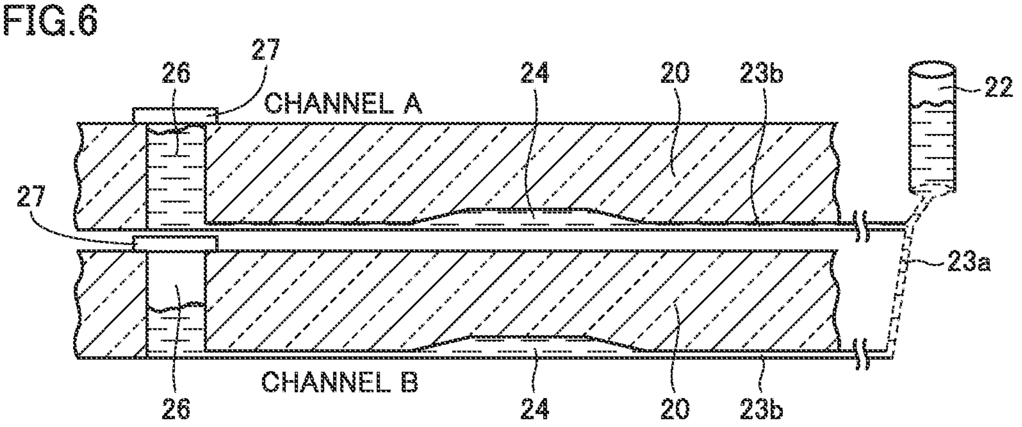
FIG. 6 is a diagram showing a state after the test solution is injected into the channel in the microchannel device according to the present embodiment.

FIG. 6 is a diagram showing a state after the test solution is injected into the channel in the microchannel device according to the present embodiment. An upper path shown in FIG. 6 is denoted as a path A and a lower path is denoted as a path B. The test solution that flows in from opening 22 passes through branch channel 23*a* and is divided into the test solution in microchannel 23*b* along path A and the test solution in microchannel 23*b* along path B, and reaches openings 26. As shown in FIG. 6, path B is longer in distance from opening 22 than path A. Therefore, the fluid head at opening 26 of path A is higher than the fluid head at opening 26 of path B. Since there is a difference in fluid head between path A and path B, a flow of the test solution for eliminating the difference is produced between path A and path B. When a flow of the test solution is produced in reservoirs 24 in path A and path B, a correct result may not be observed.

In the present embodiment, after the test solution is injected into the plurality of microchannels 23*b*, the test solution that remains in branch channel 23*a* is discharged to collection portion 28. By discharging the test solution that remains in branch channel 23*a*, each channel becomes independent such that the plurality of microchannels 23*b* and openings 26 are not connected to one another through branch channel 23*a* and the entirety cannot be regarded as a single channel. The flow caused by the difference in fluid head is thus prevented.

Figure 7:
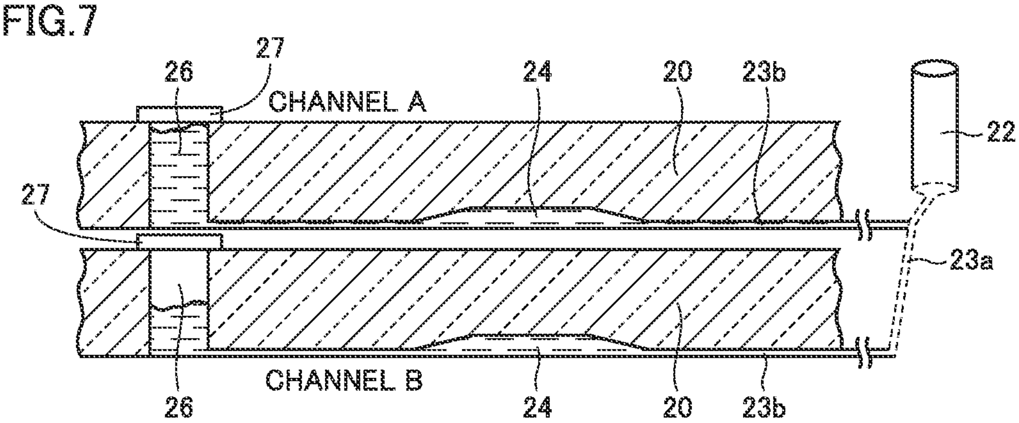
FIG. 7 is a diagram showing a state after the test solution is discharged from a branch channel in the microchannel device according to the present embodiment.

FIG. 7 is a diagram showing a state after the test solution is discharged from the branch channel in the microchannel device according to the present embodiment. An upper path shown in FIG. 7 is denoted as a path A and a lower path is denoted as a path B. By discharging the test solution from branch channel 23*a*, microchannel 23*b* along path A and microchannel 23_b_ along path B cannot be regarded as a single channel through branch channel 23_a_. Therefore, even when the fluid head at opening 26 of path A is higher than the fluid head at opening 26 of path B, a flow of the test solution for eliminating the difference is not produced between path A and path B.

Figure 8:
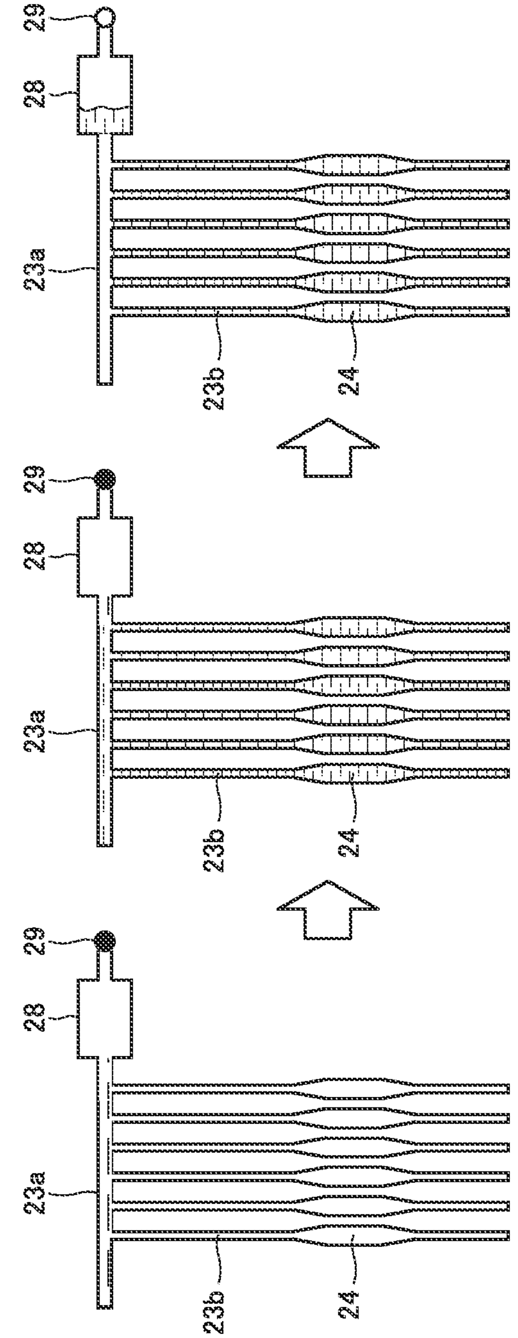
FIG. 8 is a diagram for illustrating a method of discharging the test solution from the branch channel in the microchannel device according to the present embodiment.

FIG. 8 is a diagram for illustrating a method of discharging the test solution from the branch channel in the microchannel device according to the present embodiment. In FIG. 8, the plurality of microchannels 23_b_ are connected to branch channel 23_a_, collection portion 28 is connected to one end of branch channel 23_a_, and opening 29 is provided at an end of collection portion 28 opposite to the end connected to branch channel 23_a_. Though not shown, branch channel 23_a_ is connected to opening 22 at the end opposite to the end connected to collection portion 28.

Each microchannel 23_b_ is higher in channel resistance than branch channel 23_a_. Therefore, when the test solution flows into branch channel 23_a_, unless branch channel 23_a_ is completely filled with the test solution, the test solution does not flow into each microchannel 23_b_. In order for each microchannel 23_b_ to be higher in channel resistance than branch channel 23_a_, branch channel 23_a_ should be larger in cross-sectional area than each microchannel 23_b_. When branch channel 23_a_ is equal in width to each microchannel 23_b_, branch channel 23_a_ is made larger in depth than each microchannel 23_b_. For example, by setting the depth of each microchannel 23_b_ to 0.001 mm with the depth of branch channel 23_a_ being set to 0.5 mm, the cross-sectional area of branch channel 23_a_ can be five hundred times as large as that of each microchannel 23_b_.

When the test solution flows into branch channel 23_a_, opening 29 is closed by silicone resin 30_a_ of opening and closing unit 30. Therefore, the test solution that flows into branch channel 23_a_ is not discharged to collection portion 28 at this stage. After branch channel 23_a_ is completely filled with the test solution, the test solution flows into microchannels 23_b_ substantially at the same time as shown in FIG. 8. The test solution thus flows into each microchannel 23_b_ and each reservoir 24.

Thereafter, silicone resin 30_a_ of opening and closing unit 30 that closes opening 29 is removed and air is sent from opening 22 while opening 29 is open, so that the test solution that remains in branch channel 23_a_ is discharged to collection portion 28 as shown in FIG. 8. Air discharged from pipet chip 1 for injecting the test solution can be used as air sent from opening 22. Collection portion 28 includes a space where the test solution in branch channel 23_a_ to be discharged is held (buffer space), and the space is larger than a volume of branch channel 23_a_.

Whether or not to discharge the test solution in branch channel 23_a_ to collection portion 28 can be controlled by opening and closing of opening 29. The test solution that remains in branch channel 23_a_ is discharged from opening 22 to collection portion 28 by means of air.

Figure 9:
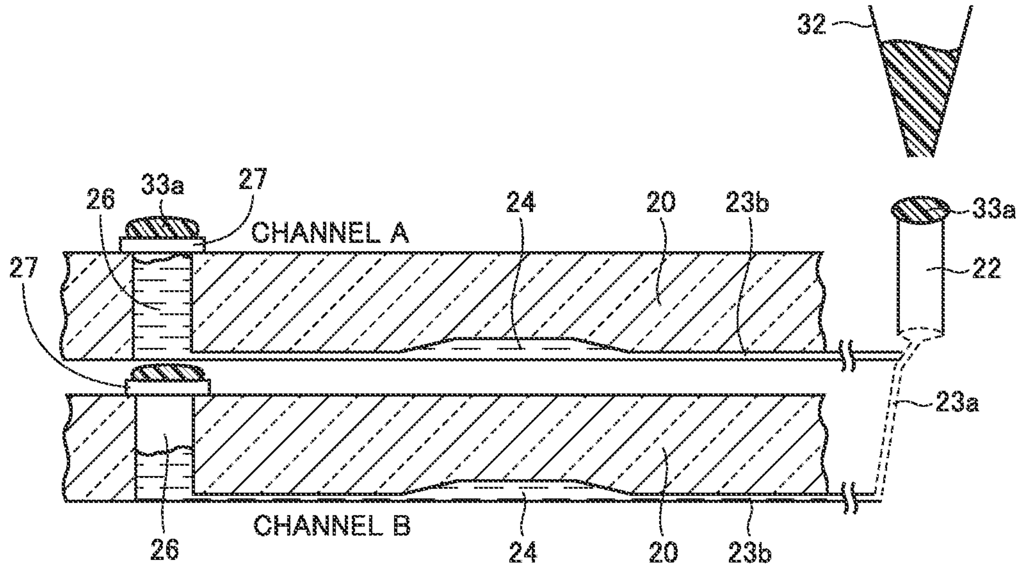
FIG. 9 is a diagram showing a state in which a sealing material is applied to an opening in the microchannel device according to the present embodiment.

In the present embodiment, the test solution is injected into each microchannel 23_b_ and the test solution that remains in branch channel 23_a_ is discharged to collection portion 28. Thereafter, a sealing material such as silicone oil is applied to opening 22, opening 26, and opening 29. FIG. 9 is a diagram showing a state in which a sealing material is applied to the opening in the microchannel device according to the present embodiment. As shown in FIG. 9, applicator 32 applies silicone oil 33_a_ to opening 22, opening 26, and opening 29 (see FIG. 8). By applying silicone oil 33_a_ to opening 22, opening 26, and opening 29, volatilization of the test solution in each microchannel 23_b_ from opening 22, opening 26, and opening 29 can be suppressed. Since gas permeable membrane 27 is provided over opening 26, silicone oil 33_a_ is applied at least to opening 22 and opening 29.

The sealing material to be applied to opening 22, opening 26, and opening 29 is not limited to silicone oil 33_a_, and any material is applicable so long as the material rests at opening 22, opening 26, and opening 29 and suppresses volatilization of the test solution.

Figure 10:
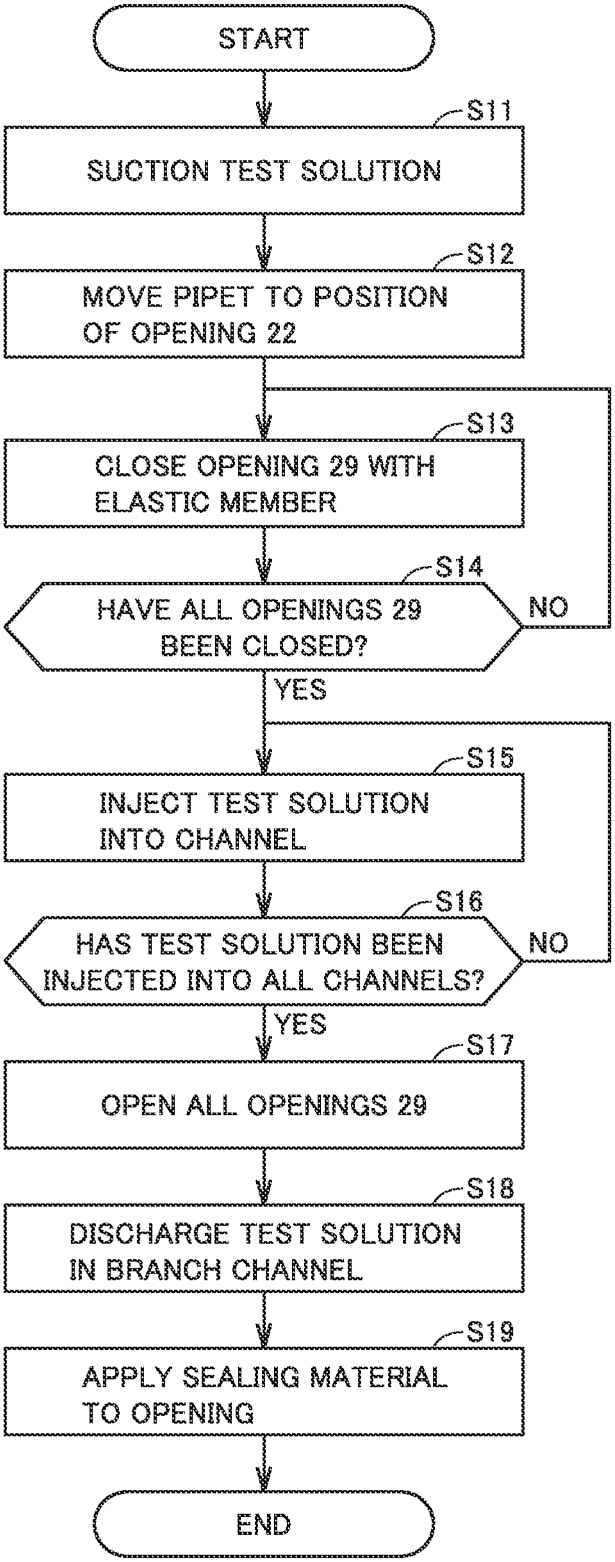
FIG. 10 is a flowchart for illustrating an injection method in the test apparatus according to the present embodiment.

An injection method in the test apparatus according to the present embodiment will now be described with reference to a flowchart. FIG. 10 is a flowchart for illustrating the injection method in the test apparatus according to the present embodiment. Initially, controller 50 of test apparatus 100 controls the motor of pipet nozzle driver 12 to move pipet nozzle 15 to a position of prescribed test solution container 5, and controls pump 14 to suction the test solution in test solution container 5 from the tip end of pipet chip 1 (step S11). Controller 50 controls the motor of pipet nozzle driver 12 to move pipet nozzle 15 to the position of opening 22 in microchannel device 2 (step S12).

The position of opening and closing unit 30 with respect to pipet nozzle 15 is determined in advance in accordance with the position of opening 29 with respect to opening 22 in microchannel device 2. Therefore, when pipet nozzle 15 is aligned with the position of opening 22 in microchannel device 2 in step S12, opening and closing unit 30 has moved to a position directly above opening 29. Controller 50 controls opening and closing driver 31 to move an elastic member (silicone resin 30_a_) to the position where it closes opening 29 (step S13). Controller 50 determines whether or not openings 29 have been closed based on whether or not the elastic members (silicone resins 30_a_) have been moved to positions where all openings 29 are closed (step S14). When it is determined that all openings 29 have not been closed (NO in step S14), controller 50 has the process return to step S13.

When it is determined that all openings 29 have been closed (YES in step S14), controller 50 controls pump 14 to discharge the test solution from the tip end of pipet chip 1 to inject the test solution into the channel (branch channel 23_a_ and microchannel 23_b_) in microchannel device 2 (step S15).

Controller 50 determines whether or not the test solution has been injected into all channels in microchannel device 2 (step S16). Controller 50 determines whether or not the test solution has been injected into all channels in microchannel device 2, for example, based on a time period of injection of the test solution into the channels in microchannel device 2 and a remaining amount of the test solution in pipet chip 1. When the test solution has not been injected into all channels in microchannel device 2 (NO in step S16), controller 50 has the process return to step S15.

When the test solution has been injected into all channels in microchannel device 2 (YES in step S16), controller 50 controls opening and closing driver 31 to move the elastic member (silicone resin 30_a_) from the position where it closes opening 29 to open opening 29 (step S17). Controller 50 controls pump 14 to discharge air from the tip end of pipet chip 1 to discharge the test solution that remains in branch channel 23_a_ to collection portion 28 (step S18).

Controller 50 controls the motor of pipet nozzle driver 12 to move applicator 32 to positions of openings 22, 26 and 29 to apply the sealing material to openings 22, 26, and 29 (step S19).

[Modification]

(1) In test apparatus 100 according to the present embodiment, opening 29 is closed by silicone resin 30*a* of opening and closing unit 30. Without being limited as such, any construction to switch between opening and closing of opening 29 may be applicable. For example, when an opening and closing mechanism (a shutter etc.) is provided in advance at opening 29 of microchannel device 2, opening and closing unit 30 may be constructed to switch a state of the opening and closing mechanism.

(2) In test apparatus 100 according to the present embodiment, the sealing material is described as being applied to openings 22, 26, and 29. Without being limited as such, any construction may be applicable so long as volatilization of the test solution can be suppressed. For example, volatilization of the test solution may be suppressed by attaching a prepared cover to openings 22, 26, and 29.

Figure 11A:
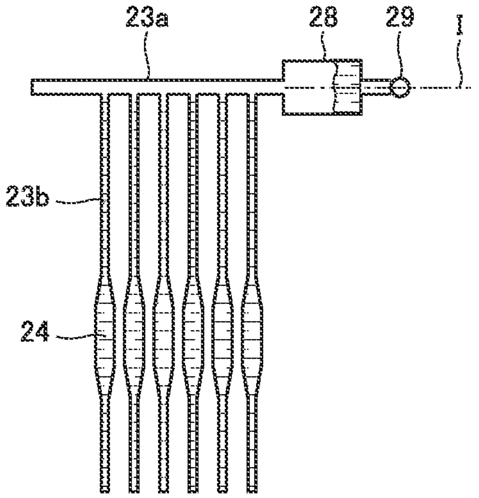
FIG. 11A is a plan view of a portion where a collection portion is provided at an end of the branch channel connected to a plurality of microchannels.
Figure 11B:
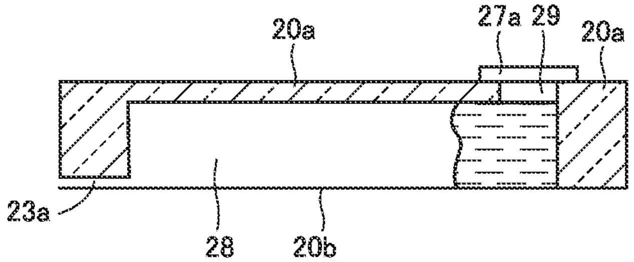
FIG. 11B is a cross-sectional view along the line I, of the collection portion shown in FIG. 11A.

(3) In test apparatus 100 according to the present embodiment, for example, opening 29 has an annular cross-section and communicates with collection portion 28. Therefore, when the test solution that remains in branch channel 23*a* is discharged to collection portion 28 by sending air from opening 22 while opening 29 is open, depending on the pressure of sent air, the test solution is not only discharged to collection portion 28 but also may flow over opening 29. Then, opening 29 is covered with a gas permeable membrane. FIG. 11 is a diagram showing a construction of the collection portion and the opening according to a modification. FIG. 11A is a plan view of a portion where collection portion 28 is provided at the end of branch channel 23*a* connected to the plurality of microchannels 23*b*. FIG. 11B is a cross-sectional view along the line I, of collection portion 28 shown in FIG. 11A.

FIG. 11B shows a gas permeable membrane 27*a* that covers opening 29. Gas permeable membrane 27*a* may be made of a material the same as or different from the material for gas permeable membrane 27 that covers opening 26, and should only perform a function to allow passage of gas and not to allow passage of liquid. Examples of the material for gas permeable membrane 27*a* include polytetrafluoroethylene (PTFE). Gas permeable membrane 27*a* is preferably water-repellent. Gas permeable membrane 27*a* has a thickness not larger than 1 mm.

By covering opening 29 with gas permeable membrane 27*a*, in discharging the test solution that remains in branch channel 23*a* to collection portion 28, a flow of the test solution over opening 29 can be prevented. In order to close opening 29, opening 29 should be closed by silicone resin 30*a* of opening and closing unit 30 from above gas permeable membrane 27*a*.

By thus further including gas permeable membrane 27*a* that covers opening 29 (second opening), in discharging the test solution that remains in branch channel 23*a* to collection portion 28, possibility that the test solution does not stay in collection portion 28 but is discharged from opening 29 can be lowered.

Though opening 29 is provided at the end of collection portion 28 opposite to the end connected to branch channel 23*a* in FIG. 11B, a construction without opening 29 can be realized by providing an aperture in collection portion 28 itself. Even with a construction without opening 29, the test solution that remains in branch channel 23*a* should be discharged to collection portion 28 by sending air from opening 22 while the aperture provided in collection portion 28 is open. Therefore, depending on a pressure of sent air, the test solution is not only discharged to collection portion 28 but also may flow over the aperture provided in collection portion 28.

Figure 11C:
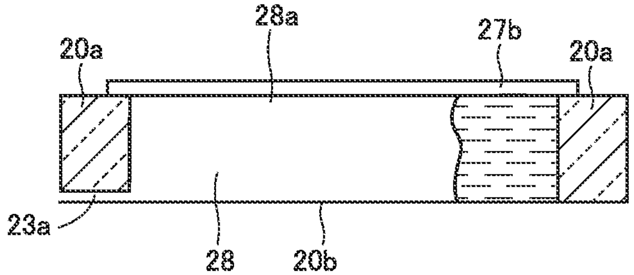
FIG. 11C is a diagram showing a modification of the collection portion.

FIG. 11C shows a modification of collection portion 28 shown in FIG. 11B. FIG. 11C shows an aperture 28*a* provided by removing entire first plate-shaped member 20*a* on the upper surface of collection portion 28. Aperture 28*a* provided in collection portion 28 is covered with a gas permeable membrane 27*b*. By providing aperture 28*a* in the entire upper surface of collection portion 28, the entire surface of gas permeable membrane 27*b* is unlikely to be in contact with the test solution, and air always escapes through gas permeable membrane 27*b*. All test solution that remains in branch channel 23*a* is thus more readily discharged. Aperture 28*a* does not have to be provided in the entire upper surface of collection portion 28, and it may be provided in at least a part of the upper surface of collection portion 28 so long as it is sufficiently large for an amount of the test solution discharged to collection portion 28.

Gas permeable membrane 27*b* may be made of a material the same as or different from the material for gas permeable membrane 27 that covers opening 26, and should only perform a function to allow passage of gas and not to allow passage of liquid. Examples of the material for gas permeable membrane 27*b* include polytetrafluoroethylene (PTFE). Gas permeable membrane 27*b* is preferably water-repellent. Gas permeable membrane 27*b* has a thickness not larger than 1 mm.

By covering aperture 28*a* provided in collection portion 28 with gas permeable membrane 27*b*, in discharging the test solution that remains in branch channel 23*a* to collection portion 28, a flow of the test solution over aperture 28*a* can be prevented. In order to close aperture 28*a*, entire aperture 28*a* should be closed by silicone resin 30*a* of opening and closing unit 30 from above gas permeable membrane 27*b*.

Thus, collection portion 28 28 includes aperture 28*a* in at least a part thereof and further includes gas permeable membrane 27*b* that covers aperture 28*a*, so that all test solution that remains in branch channel 23*a* can readily be discharged and possibility that the test solution does not stay in collection portion 28 but is discharged from aperture 28*a* can be lowered.

[Aspects]

The embodiment described above is understood by a person skilled in the art as specific examples of aspects below.

(Clause 1)

A test apparatus according to one aspect is a test apparatus for a test using a test solution containing a sample with a microchannel device, the microchannel device includes a first opening where the test solution is received, a plurality of branch channels that communicate with the first opening, a plurality of microchannels that communicate with each of the branch channels, a collection portion where some of the test solution is collected, the collection portion being provided at an end of each of the branch channels located opposite to a side where communication with the first opening is established, and a second opening provided in the collection portion, the test apparatus includes a pressure application unit that is connected to the first opening and applies an air pressure to inject the test solution into the microchannels, an opening and closing unit that switches between opening and closing of the second opening, and a controller that controls the pressure application unit and the opening and closing unit, the controller controls the opening and closing unit to close the second opening and controls the pressure application unit to inject the test solution into the microchannels, and the controller controls the opening and closing unit to open the second opening after the test solution is injected into the microchannels and controls the pressure application unit to apply an air pressure to collect in the collection portion, the test solution in each of the branch channels.

According to the test apparatus described in Clause 1, the test solution in the branch channel can be discharged to the collection portion and collected therein. Therefore, a flow of the test solution produced in a channel can be suppressed and a correct result can be observed.

(Clause 2)

In the test apparatus described in Clause 1, the opening and closing unit includes a mechanism for closing the second opening with an elastic member.

According to the test apparatus described in Clause 2, the second opening is closed by the elastic member. Therefore, the apparatus construction can be simplified and the second opening can readily be closed.

(Clause 3)

In the test apparatus described in Clause 1, the pressure application unit includes a pipet that suctions or discharges the teat solution and a movement mechanism that changes a position of the pipet and a position of the microchannel device relative to each other, and the test solution is injected into the microchannels as the movement mechanism connects the pipet to the first opening to discharge the suctioned test solution to the first opening.

According to the test apparatus described in Clause 3, the test solution can readily be injected into each microchannel in the microchannel device.

(Clause 4)

The test apparatus described in Clause 1 further includes an applicator that applies a sealing material that suppresses volatilization of the test solution, the microchannel device further includes a third opening provided on a downstream side when viewed from the side where communication with the branch channel is established, and the applicator applies the sealing material at least to the first opening and the third opening of each of the microchannels in which the test solution has been injected.

According to the test apparatus described in Clause 4, since the sealing material is applied to the first opening and the third opening, volatilization of the test solution from the opening can be prevented.

(Clause 5)

In the test apparatus described in Clause 4, the sealing material is silicone oil.

According to the test apparatus described in Clause 5, since the sealing material is silicone oil, the sealing material is readily applied to the opening.

(Clause 6)

An injection method according to one aspect is an injection method of injecting a test solution containing a sample into a microchannel device, the microchannel device includes a first opening where the test solution is received, a plurality of branch channels that communicate with the first opening, a plurality of microchannels that communicate with each of the branch channels, a collection portion where some of the test solution is collected, the collection portion being provided at an end of each of the branch channels located opposite to a side where communication with the first opening is established, and a second opening provided in the collection portion, and the injection method includes closing the second opening, connecting a pipet that has suctioned the test solution to the first opening, injecting the test solution into the microchannels by discharging the suctioned test solution to the first opening, opening the second opening, and applying an air pressure with the pipet to collect in the collection portion, the test solution in each of the branch channels.

According to the injection method described in Clause 6, the test solution in the branch channel can be discharged to the collection portion and collected therein. Therefore, a flow of the test solution produced in a channel can be suppressed and a correct result can be observed.

(Clause 7)

In the injection method described in Clause 6, the microchannel device further includes a third opening provided on a downstream side when viewed from the side where communication with the branch channel is established, and the injection method farther includes applying a sealing material that suppresses volatilization of the test solution at least to the first opening and the third opening of each of the microchannels in which the test solution has been injected.

According to the injection method described in Clause 7, since the sealing material is applied to the first opening and the third opening, volatilization of the test solution from the opening can be prevented.

(Clause 8)

In the injection method described in Clause 7, the sealing material is silicone oil.

According to the injection method described in Clause 8, since the sealing material is silicone oil, the sealing material is readily applied to the opening.

(Clause 9)

A microchannel device according to one aspect is a microchannel device used in a test using test solution containing a sample, and the microchannel device includes a first opening where the test solution is received, a plurality of branch channels that communicate with the first opening, a plurality of microchannels that communicate with each of the branch channels, a collection portion where some of the test solution is collected, the collection portion being provided at an end of each of the branch channels located opposite to a side where communication with the first opening is established, and a second opening provided in the collection portion.

According to the microchannel device described in Clause 9, the test solution in the branch channel can be discharged to the collection portion and collected therein. Therefore, a flow of the test solution produced in a channel can be suppressed and a correct result can be observed.

(Clause 10)

In the microchannel device described in Clause 9, the collection portion is a buffer space that communicates with an end of each of the branch channels and is larger in volume than each of the branch channels.

According to the microchannel device described in Clause 10, the collection portion is a buffer space larger in volume than the branch channel, and hence the test solution that remains in the branch channel can all be collected.

(Clause 11)

In the microchannel device described in Clause 10, the buffer space is provided with a water absorbing member.

According to the microchannel device described in Clause 11, a backflow from the collection portion to the branch channel can be prevented and volatilization of the test solution from the branch channel can be prevented.

(Clause 12)

In the microchannel device described in Clause 9, the microchannels are higher in channel resistance than the branch channels.

According to the microchannel device described in Clause 12, the microchannel is higher in channel resistance than the branch channel, and hence the test solution in the branch channel can flow into the microchannels substantially at the same time.

(Clause 13)

The microchannel device described in Clause 9 further includes a gas permeable membrane that covers the second opening.

According to the microchannel device described in Clause 13, in discharging the test solution that remains in the branch channel to the collection portion, possibility that the test solution does not stay in the collection portion but is discharged from the opening can be lowered.

(Clause 14)

In the microchannel device described in Clause 9, the collection portion includes an aperture in at least a part, and the microchannel device further includes a gas permeable membrane that covers the aperture.

According to the microchannel device described in Clause 14, all test solution that remains in the branch channel can readily be discharged and possibility that the test solution does not stay in the collection portion but is discharged from the aperture can be lowered.

Though an embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. A test apparatus for testing a test solution containing a sample, the test apparatus comprising:

a microchannel device, the microchannel device including:

a first opening for receiving a test solution;

one or more branch channels wherein each branch channel of the one or more branch channels communicates with the first opening;

a plurality of microchannels wherein each microchannel of the plurality of microchannels has a first end and a second end, wherein the first end communicates with at least one of the one or more branch channels;

an agent in one or more of the plurality of microchannels;

a collection portion for collecting at least a portion of the test solution, the collection portion disposed at an end of each of the branch channels;

a second opening disposed in the collection portion;

a third opening disposed at each second end of the plurality of microchannels;

the test apparatus further comprising:

a pipet nozzle;

a pump configured to inject the test solution through the first opening into the microchannels by applying an air pressure via the pipet nozzle such that the test solution can react with the agent;

an opening and closing mechanism for opening and closing the second opening;

a controller programmed to control the pump, the pipet nozzle, and the opening and closing mechanism, wherein the controller controls the opening and closing mechanism such that the second opening closes with the third opening opened and wherein the controller controls the pump and the pipet nozzle such that the pump and the pipet nozzle injects the test solution into the microchannels, then controls the opening and closing mechanism such that the second opening opens after the test solution is injected into the microchannels and then controls the pump such that the pump applies an air pressure to collect the test solution from each branch channel of the one or more branch channels into the collection portion.

2. The test apparatus according to claim 1, wherein the opening and closing mechanism includes a mechanism for closing the second opening with an elastic member.

3. The test apparatus according to claim 1, further comprising:

a pipet chip connected to the pipet nozzle for sucking or discharging the test solution; and a movement mechanism configured to change a position of the pipet chip and a position of the microchannel device relative to each other such that the movement mechanism connects the pipet chip to the first opening to discharge the test solution to the first opening as the test solution is injected into at least one of the plurality microchannels.

4. The test apparatus according to claim 1, further comprising:

an applicator configured to apply a sealing material that suppresses a volatilization of the test solution to at least to the first opening and the third opening of each of the microchannels.

5. The test apparatus according to claim 4, wherein the sealing material is a silicone oil.

6. A test apparatus for testing a test solution containing a sample, the test apparatus comprising:

a microchannel device, the microchannel device including:

a first opening for receiving a test solution;

one or more branch channels wherein each branch channel of the one or more branch channels communicates with the first opening;

a plurality of microchannels wherein each microchannel of the plurality of microchannels has a first end and a second end, wherein the first end communicates with at least one of the one or more branch channels;

a collection portion for collecting at least a portion of the test solution, the collection portion disposed at an end of each of the branch channels of the one or more branch channels;

a second opening disposed in the collection portion;

a third opening disposed at each second end of the plurality of microchannels;

the test apparatus further comprising:

a pipet nozzle;

a pump configured to inject the test solution through the first opening into the microchannels by applying an air pressure via the pipet nozzle;

an opening and closing mechanism for opening and closing the second opening;

a controller programmed to control the pump, the pipet nozzle, and the opening and closing mechanism, wherein the controller controls the opening and closing mechanism such that the second opening closes with the third opening opened and wherein the controller controls the pump and the pipet nozzle such that the pump and the pipet nozzle injects the test solution into the microchannels, then controls the opening and closing mechanism such that the second opening opens after the test solution is injected into the microchannels and then controls the pump such that the pump applies an air pressure to collect the test solution from each branch channel of the one or more branch channels into the collection portion.

* * * * *